United States Patent [19]
Griscom

[11] Patent Number: 5,574,820
[45] Date of Patent: Nov. 12, 1996

[54] RADIATION HARDENING OF PURE SILICA CORE OPTICAL FIBERS AND THEIR METHOD OF MAKING BY ULTRA-HIGH-DOSE GAMMA RAY PRE-IRRADIATION

[76] Inventor: David L. Griscom, 7304 Rebecca Dr., Alexandria, Va. 22307

[21] Appl. No.: 497,661

[22] Filed: Jun. 30, 1995

[51] Int. Cl.$^6$ .................................................. G02B 6/16
[52] U.S. Cl. ........................ 385/142; 250/492.1; 385/123
[58] Field of Search .................................... 385/123, 124, 385/141, 142, 144; 250/492.1, 492.3

[56] References Cited

U.S. PATENT DOCUMENTS

| | | | |
|---|---|---|---|
| 4,182,664 | 1/1980 | Maklad et al. | 250/492.1 X |
| 4,626,068 | 12/1986 | Caldwell | 385/141 X |
| 4,669,821 | 6/1987 | Blair et al. | 385/142 |
| 4,733,939 | 3/1988 | Utsumi et al. | 385/123 |
| 5,267,343 | 11/1993 | Lyons et al. | 385/141 |

OTHER PUBLICATIONS

Nagasawa, Kaya et al., "Radiation Effects on Pure Silica Core Optical Fibers by y-Rays: Relation between 2 eV Band and Non-Bridging Oxygen Hole Centers", Japanese Journal of Applied Physics, vol. 25, No. 3, pp. 464–468, Mar., 1986.
Nagasawa, Kaya et al., "Gamma-Ray-Induced Absorption Bands in Pure-Silica-Core Fibers", Japanese Journal of Applied Physics, vol. 23, No. 12, pp. 1608–1613, Dec., 1984.
Friebele, E. J. et al., "Radiation-Induced Optical Absorption Bands in Low Loss Optical Fiber Waveguides", Journal of Non-Crystalline Solids, 38 & 39, pp. 245–250, 1980. (No Month).
Nagasawa, Kaya et al., "Gamma-Ray Induced Absorption Band at 770 nm in Pure Silica Core Optical Fibers", Japanese Journal of Applied Physics, vol. 23, No. 5, pp. 606–611, May, 1984.
Sigel, G. H., Jr., et al., "Radiation Response of Large Core Polymer Clad Silica Optical Fibers", IEEE Transactions on Nuclear Science, vol. NS–26, No. 6, pp. 4796–4801, Dec., 1979.
Nagasawa, Kaya et al., "Effect of Cladding Material on 2-eV Optical Absorption in Pure-Silica Core Fibers and Method to Suppress the Absorption", Japanese Journal of Applied Physics, vol. 26, No. 1, pp. 148–151, Jan., 1987.
Griscom, "Defect Structure of Glasses", Journal of Non-Crystalline Solids, 73, pp. 51–77, 1985. (No Month).
West, R. H. et al., "Radiation-Hardened Pure Silica-Core Fibre Optics", Electronics Letters, vol. 19, No. 16, pp. 622–623, Aug. 4, 1983.
Griscom, "Radiation Hardening of Pure-Silica-Core Optical Fibers by Ultra-High-Dose y-ray Pre-Irradiation", Journal of Applied Physics, 77 (10), pp. 5008–5013, May 15, 1995.
Dianov, E. M. et al., "Influence of the Temperature and Optical Power Level on Induced Absorption in Fiber-Optic Waveguides of Pure Quartz Glass", Sov. J. Quantum Electron, 11 (9), pp. 1171–1177, Sep., 1981.
Nagasawa, Kaya et al., "Effect of Oxygen Content on Defect Formation in Pure-Silica Core Fibers", Japanese Journal of Applied Physics, vol. 26, No. 5, pp. L554–L557, May, 1987.
West, "A Local View of Radiation Effects in Fiber Optics", Journal of Lightwave Technology, vol. 6, No. 2, pp. 155–164, Feb., 1988.

Primary Examiner—John D. Lee
Attorney, Agent, or Firm—Thomas E. McDonnell; John J. Karasek

[57] ABSTRACT

A process for radiation hardening a pure-silica-core fiber, the process comprising the steps of:

(a) providing a pure-silica-core fiber having a core index of refraction and having an outer surface;

(b) exposing the fiber to a dose of ionizing radiation sufficient to permanently reduce transmission losses of the fiber to no more than about 30 dB/km within a wavelength range of about 400 nm to about 700 nm. In addition, white light may simultaneously be transmitted through the fiber during the exposure of the fiber to ionizing radiation. The presently claimed invention is directed to the above process and the radiation hardened fiber formed according to the above processing steps.

45 Claims, 4 Drawing Sheets

RADIATION HARDENING OF PURE SILICA CORE OPTICAL FIBERS AND THEIR METHOD OF MAKING BY ULTRA-HIGH-DOSE GAMMA RAY PRE-IRRADIATION

BACKGROUND OF THE INVENTION

1. Field of the Invention

The presently claimed invention relates to radiation hardened optical fibers and a method of making the same. More particularly, the presently claimed invention relates to silica core fibers (i.e. $SiO_2$ core fiber) with or without an F doped silica cladding wherein such fibers are hardened to reduce radiation induced losses in the visible wavelength range (i.e. 400–700 nm) and a method of making the same.

2. Description of the Related Art

It is recognized that pure synthetic silica core fibers exhibit relatively large permanent radiation induced losses to transmissions below about 650 nm. See West, R. H. and Lenham, A. P., *Radiation-Hardened Pure Silica-Core Fibre Optics, Electronic Letters*, Vol. 19 (16), pp. 622–623 (Aug. 4, 1983), incorporated herein by reference in its entirety and for all purposes. West et al. comment that "in this lower wavelength region . . . the hardening exposures themselves produce a relatively large permanent loss, typically 1000 dB/km after $10^4$ Gy." Id at 622. The B-2 fibers (i.e. fibers containing 750 ppm of OH, 100 ppm of Cl in the core and containing a cladding of F-doped silica) of Nagasawa et al., infra, and the OH-800-B fibers (i.e. fibers containing 700 ppm of OH, 100 ppm of Cl in the core and containing a silicone resin cladding) also of Nagasawa et al., infra, exhibit absorption peaks in the wavelength region from 600 to 630 nm after γ-ray irradiation of 12 kGy (i.e. $1.2 \times 10^4$ Gray=$1.2 \times 10^6$ rad). The magnitude of the absorption peaks are 2000 dB/km and 250 dB/km in the B-2 and OH-800-B fibers, respectively. See Nagasawa et al., *Radiation Effects on Pure Silica Core Optical Fibers by γ-Rays: Relation between 2 eV Band and Non-Bridging Oxygen Hole Centers*, Japanese Journal of Applied Physics, Vol. 25 (3), pp. 464–468 (March, 1986), incorporated herein by reference in its entirety and for all purposes. See also Nagasawa et al. at pp. 465, FIG. 2. Due to absorption bands appearing in the 400–700 nm visible spectrum range, pure synthetic silica (PSS) core fibers have not been useful for transmitting images in the visible range wherein such optical fibers are exposed to varying levels of γ-irradiation.

If pure synthetic silica fibers could be manufactured that have the ability to transmit images in the 400–700 nm wavelength range during extended exposure to γ-irradiation, such fibers would be useful in various applications. Such applications include optical fibers for monitoring tokamak fusion reactors, image guides for visual inspection of fission reactors, image guides for visual inspection of nuclear waste repositories and image guides amenable to sterilizing γ-irradiation (i.e. without loss of transmission in the visible wavelength range) prior to use in medical instrumentation of various types.

The shortcomings of irradiation induced transmission losses in the visible wavelength range (i.e. about 400–700 nm) of pure synthetic silica fibers is fully documented. See Nagasawa, K., Tanabe, M., and Yahagi, K., *Gamma-Ray Induced Absorption Bands in Pure-Silica-Core Fibers*, Japanese Journal of Applied Physics, Vol. 23 (12), pp. 1608–1613 (December, 1984), incorporated herein by reference in its entirety and for all purposes. See Friebele et al., *Radiation-Induced Optical Absorption Bands in Low Loss Optical Fiber Waveguides*, Journal of Non-Crystalline Solids 38 & 39, pp. 245–250 (1980), incorporated herein by reference in its entirety and for all purposes. See Nagasawa et al., *Gamma-Ray Induced Absorption Band at 770 nm in Pure Silica Core Optical Fibers*, Japanese Journal of Applied Physics, Vol. 23 (5), pp. 606–611 (May, 1984), incorporated herein by reference in its entirety and for all purposes. FIG. 3 of Nagasawa et al. in the Japanese Journal of Applied Physics, Vol. 23 (5) at p. 608 illustrates that upon exposure of various pure synthetic silica fibers to doses of gamma-irradiation on the order of $1.2 \times 10^4$ Gray at a dose rate of 250 Gray/hour, induced losses on the order of about 600 to 800 dB/km appear in the visible wavelength region. See also Sigel et al., *Radiation Response of Large Core Polymer Clad Silica Optical Fibers*, IEEE Transactions on Nuclear Science, Vol. NS-26 (6), pp. 4796–4801 (Dec. 6, 1979), incorporated herein by reference in its entirety and for all purposes. See also Nagasawa et al., *Effect of Cladding Material on 2-eV Optical Absorption in Pure-Silica Core Fibers and Method to Suppress the Absorption*, Japanese Journal of Applied Physics, Vol. 26 (1) pp. 148–151 (January, 1987) wherein the authors state that "when optical fibers are used to guide a visual image, it is essential to suppress the optical absorption in the visible-wavelength region . . . . The absorption band at around 630 nm, which is sometimes called the 2-eV absorption band, needs to be suppressed." Id at 148. Nagasawa et al. suggest that "the 2-eV absorption can be reduced by a combined-treatment of hydrogen and irradiation . . . . The authors believe that this treatment is valid to improve radiation resistance of any fiber." Id at 150. While the suggested irradiation and hydrogen may be useful to reduce gamma irradiation induced losses in the visible wavelength region, it is further recognized that such treatment is only partially successful in reducing such losses. Various difficulties including trapping sufficient amounts of hydrogen, having to hermetically seal fibers against outdiffusion of hydrogen and undue expense are encountered. See also D. L. Griscom, *Defect Structure of Glasses*, Journal of Non-Crystalline Solids Vol. 73, pp. 51–77 (1985), incorporated herein by reference in its entirety and for all purposes.

Radiation hardening is a process wherein a permanent reduction of induced loss occurs during continuous irradiation. See West, R. H., *A Local View of Radiation Effects in Fiber Optics*, Journal of Lightwave Technology, Vol. 6 (2), pp. 155–164 (1988), incorporated herein by reference in its entirety and for all purposes. While radiation hardening has been observed in the IR wavelength range, radiation hardening sufficient to transmit visible spectral images has to date not been successfully accomplished wherein induced losses are below about 30 dB/km in pure synthetic silica fibers at doses of at least 100,000 Gray.

SUMMARY OF THE INVENTION

It is therefore an object of the present invention to provide radiation hardened, infra, pure synthetic silica optical fibers wherein the radiation hardening is in the visible spectral wavelength range of about 400 to about 700 nm wherein induced losses are below about 30 dB/km at a total dose of at least about 100,000 Gray.

It is another object of the present invention to provide a method for making radiation hardened pure synthetic silica optical fibers wherein radiation hardening is in the visible spectral wavelength range of about 400 to about 700 nm wherein induced losses are below about 30 dB/km at a total dose of at least about 100,000 Gray.

It is yet another object of the present invention to provide radiation hardened pure synthetic silica optical fibers for transmission in the visible spectral wavelength range of about 400 to about 700 nm wherein the radiation hardened pure synthetic silica fiber exhibit induced losses on the order of no more than about 30 dB/km at a total dose of at least about 100,000 Gray.

A radiation hardened fiber is further defined as one wherein radiation induced losses in the wavelength range of about 400 to about 700 nm never rise above 30 dB/km when exposed to a total dose of at least about 100,000 Gray.

These and other objects are accomplished by the following process comprising the steps of:

(a) providing a pure-silica-core fiber having a core index of refraction and having an outer surface;

(b) exposing said fiber to a dose of ionizing radiation sufficient to permanently harden said fiber (i.e. reduce transmission losses) so that any subsequent irradiation of said fiber will cause no more than about 30 dB/km losses within a wavelength range of about 400 nm to about 700 nm.

Alternatively, these and other objects are accomplished by the following process comprising the steps of:

(a) providing a pure-silica-core fiber having a core index of refraction and having an outer surface;

(b) propagating white light through said fiber; and (c) simultaneously exposing said fiber to a dose of ionizing radiation sufficient to permanently harden said fiber (i.e. reduce transmission losses) so that any subsequent irradiation of said fiber will cause no more than about 30 dB/km losses within a wavelength range of between about 400 nm to about 700 nm.

Having performed the above process, the resultant pure synthetic silica fiber comprises a radiation hardened pure synthetic silica fiber having radiation induced losses on the order of no more than about 30 dB/km in the visible wavelength range of about 400 to about 700 nm. Re-exposure of the resultant radiation hardened fiber to radiation above about 100,000 Gray will not increase radiation induced losses above about 30 dB/km in the wavelength range from about 400 to about 700 nm.

BRIEF DESCRIPTION OF THE DRAWINGS

A more complete appreciation of the present invention and several of the accompanying advantages thereof will be readily obtained by reference to the following detailed description when considered in conjunction with the accompanying drawings, wherein.

1: Dose=$2.1 \times 10^2$ Gray (Gy),
2: Dose=$8.4 \times 10^2$ Gray (Gy),
3: Dose=$2.5 \times 10^3$ Gray (Gy),
4: Dose=$7.8 \times 10^3$ Gray (Gy),
5: Dose=$1.7 \times 10^4$ Gray (Gy),
6: Dose=$5.1 \times 10^4$ Gray (Gy),
7: Dose=$1.5 \times 10^5$ Gray (Gy),
8: Dose=$5.9 \times 10^5$ Gray (Gy),
9: Dose=$8.0 \times 10^5$ Gray (Gy),
10: Dose=$1.2 \times 10^6$ Gray (Gy) and
11: No additional dose: out of γ-ray source for 30 seconds.

The various curves are numbered to indicate the doses of radiation to which the fibers were exposed.

11: No additional dose: out of γ-ray source for 30 seconds,
15: No additional dose: out of γ-ray source for 2,430 seconds,
16: No additional dose: out of γ-ray source for 21,720 seconds,
17: No additional dose: out of γ-ray source for 269,400 seconds,
18: No additional dose: out of γ-ray source for 447,360 seconds,
19: Returned to source (i.e. corresponding to FIG. 3e at lowest γ-ray dose),
20: Baseline (i.e. reference fiber, infra)

For additional details, see Griscom, D. L., *Radiation hardening of pure-silica-core optical fibers by ultra-high-dose γ-ray pre-irradiation*, J. Appl. Phys., Vol. 77 (10), pp. 5008–5013 (May 15, 1995), incorporated herein by reference in its entirety and for all purposes.

1: Dose=$2.1 \times 10^2$ Gray (Gy),
2: Dose=$8.4 \times 10^2$ Gray (Gy),
3: Dose=$2.5 \times 10^3$ Gray (Gy),
4: Dose=$7.8 \times 10^3$ Gray (Gy),
5: Dose=$1.7 \times 10^4$ Gray (Gy),
6: Dose=$5.1 \times 10^4$ Gray (Gy),
7: Dose=$1.5 \times 10^5$ Gray (Gy),
8: Dose=$5.9 \times 10^5$ Gray (Gy),
9: Dose=$8.0 \times 10^5$ Gray (Gy),
10: Dose=$1.2 \times 10^6$ Gray (Gy) and
11: No additional dose: out of γ-ray source for 30 seconds.

The various curves are numbered to indicate the doses of radiation to which the fibers were exposed.

11: No additional dose: out of γ-ray source for 30 seconds,
12: No additional dose: out of γ-ray source for 103 seconds,
13: No additional dose: out of γ-ray source for 270 seconds,
14: No additional dose: out of γ-ray source for 810 seconds, 15: No additional dose: out of γ-ray source for 2,430 seconds, 16: No additional dose: out of γ-ray source for 21,720 seconds, 17: No additional dose: out of γ-ray source for 269,400 seconds, 18: No additional dose: out of γ-ray source for 447,360 seconds, and 19: Returned to source (i.e. corresponding to FIG. 3e at lowest γ-ray dose).

For additional details, see Griscom, D. L., *Radiation hardening of pure-silica-core optical fibers by ultra-high-dose γ-ray pre-irradiation*, J. Appl. Phys., Vol. 77 (10), pp. 5008–5013 (May 15, 1995), incorporated herein by reference in its entirety and for all purposes.

DESCRIPTION OF THE PREFERRED EMBODIMENTS

The following detailed description of the invention is provided to aid those skilled in the art in practicing the present invention. However, the following detailed description of the invention should not be construed to unduly limit the present invention. Variations and modifications in the embodiments discussed may be made by those of ordinary skill in the art without departing from the scope of the present inventive discovery.

The spectral nature of the visible-range damage in pure synthetic silica is well understood in terms of a band tail extending from the ultraviolet region ("UV band tail") arising from chloride impurities and/or intrinsic color centers, a band near 610 nm due to the nonbridging-oxygen hole center (NBOHC, ≡Si—O*), and a succession of progressively weaker bands in the infrared (IR) at 660, 760 and longer wavelengths. See K. Nagasawa, M. Tanabe and K. Yahagi, Jpn. J. Appl. Phys. 23, 1608–1613 (1984), incorporated herein by reference in its entirety and for all purposes. See K. Nagasawa, Y Hoshi, Y. Ohki and K. Yahagi, Jpn. J. Appl. Phys. 25, 464–468 (1986), incorporated herein by reference in its entirety and for all purposes. See E. M. Dianov, L. S. Kornienko, E. P. Nikitin, A. O. Rybaltovskii and P. V. Chernov, Sov. J. Quantum Electron. 11, 1171–1177 (1981), incorporated herein by reference in its entirety and for all purposes. See E. J. Friebele and M. E. Gingerich, J. Non-Cryst. Solids 38/39, 245–250 (1980), incorporated herein by reference in its entirety and for all purposes. See K. Nagasawa, M. Tanabe, K. Yahagi, A. Iino, and T. Kuroha, Jpn. J. Appl. Phys 23, 606–611 (1984), incorporated herein by reference in its entirety and for all purposes. The IR bands are generally believed to be impurity-related and are known to be bleachable either by the ionizing radiation itself (rad hardening by pre-irradiation) or by propagating moderately high intensity visible light (~1 μW) during or subsequent to irradiation. See K. Nagasawa, M. Tanabe and K. Yahagi, Jpn. J. Appl. Phys. 23, 1608–1613 (1984), incorporated herein by reference in its entirety and for all purposes. See E. M. Dianov, L. S. Kornienko, E. P. Nikitin, A. O. Rybaltovskii and P. V. Chernov, Sov. J. Quantum Electron. 11, 1171–1177 (1981), incorporated herein by reference in its entirety and for all purposes. See E. J. Friebele and M. E. Gingerich, J. Non-Cryst. Solids 38/39, 245–250 (1980), incorporated herein by reference in its entirety and for all purposes. See K. Nagasawa, M. Tanabe, K. Yahagi, A. Iino, and T. Kuroha, Jpn. J. Appl. Phys 23, 606–611 (1984), incorporated herein by reference in its entirety and for all purposes. See G. H. Sigel, Jr., E. J. Friebele, M. E. Gingerich and L. M. Hayden, IEEE Trans. Nucl. Sci. NS-26, 4796–4801 (1979), incorporated herein by reference in its entirety and for all purposes. See R. H. West and A. P. Lenham, Elect. Lett. 19, 622–623 (1983), incorporated herein by reference in its entirety and for all purposes. However, because the NBOHC and at least part of the UV tail have been universally perceived to be intrinsic to pure $SiO_2$, it has never been suggested that these bands might be totally suppressed at extremely high radiation doses other than by heating to temperatures ~400° C. See D. L. Griscom, J. Ceram. Soc. Japan 99, 923–942 (1991), incorporated herein by reference in its entirety and for all purposes. Indeed, Nagasawa and coworkers studied both of these spectral features for γ-ray doses of up to 61 kGy at room temperature without noting any sort of decrease in band strengths at high doses. See K. Nagasawa, M. Tanabe and K. Yahagi, Jpn. J. Appl. Phys. 23, 1608–1613 (1984), incorporated herein by reference in its entirety and for all purposes. See K. Nagasawa, Y Hoshi, Y. Ohki and K. Yahagi, Jpn. J. Appl. Phys. 25, 464–468 (1986), incorporated herein by reference in its entirety and for all purposes. See K. Nagasawa, M. Tanabe, K. Yahagi, A. Iino, and T. Kuroha, Jpn. J. Appl. Phys 23, 606–611 (1984), incorporated herein by reference in its entirety and for all purposes.

Pure synthetic silica optical fibers contain a core section, an optional cladding material and an additionally optional jacketing material fitted over the core or the optional cladding material. It is preferred that the core section be surrounded by cladding to achieve optical waveguiding (i.e. cladding having an index of refraction lower than the index of refraction of the core). It is further preferred that the core and cladding be surrounded by a jacketing material to prevent mechanical breakage. The core is generally pure silica containing varying amounts of hydroxide content measured typically in the parts per million units by weight (ppm). The pure synthetic silica may contain impurities such chloride ion also typically measured in the parts per million by weight units. Pure synthetic silica cores may be classified into two categories: (1) high OH content pure synthetic silica (high OH PSS core) and (2) low OH content pure synthetic silica (low OH PSS core).

The high OH PSS core may contain typically from about 400 to about 2000 ppm of OH. More typically, the high OH PSS core may contain from about 450 to about 1750 ppm of OH. Most typically, the high OH PSS core may contain from about 500 to about 1400 ppm of OH. Preferably, the high OH PSS core may contain from about 550 to about 1100 ppm of OH. More preferably, the high OH PSS core may contain from about 575 to about 900 ppm of OH. Most preferably, the high OH PSS core may contain from about 600 to about 800 ppm of OH.

The low OH PSS core may contain typically from about 0 or from about 1 part per billion to about 399 ppm of OH. More typically, the low OH PSS core may contain from about 1 to about 250 ppm of OH. Most typically, the low OH PSS core may contain from about 0.5 to about 150 ppm of OH. Preferably, the low OH PSS core may contain from about 0.2 to about 100 ppm of OH. More preferably, the low OH PSS core may contain from about 0.1 to about 50 ppm of OH. Most preferably, the low OH PSS core may contain from about 0.01 to about 10 ppm of OH.

It is believed that part of the radiation induced losses in the visible wavelength range are due to the presence of chloride impurities and NBOHC precursors present within the pure synthetic silica core materials. It is further believed that OH content within the pure synthetic silica is the cause of the presence of the NBOHC precursors, under appropriate manufacturing conditions. Upon irradiation, according to the presently claimed invention, the NBOHC precursors are converted to NBOHC centers which attenuate the level of absorption (i.e. absorption being proportional to the amount of induced losses measured in the visible wavelength range).

While the above identified ranges of OH content in both the low OH and high OH PSS cores are to varying degrees typical and/or preferable for radiation induction of NBOHC centers, it is conceivable to construct PSS fibers without NBOHC centers wherein the content of OH may be zero or very nearly zero resulting in a fiber which may be radiation hardened in the visible wavelength region at very low total doses (e.g. doses well below 100,000 Gray). However, until such PSS core fibers with no NBOHC precursors or very few NBOHC precursors being present are synthesized, the presently claimed invention is necessary to harden against (i.e. permanently attenuate) the induced losses found in the visible wavelength region.

Typically, for the high OH PSS core fibers, the total dose of radiation needed to cause radiation hardening in the visible wavelength region is about 100,000 Gray (or 10,000,000 rad). As described previously, the radiation hardening is accomplished by exposing the low OH and high OH PSS core fibers to relatively high doses of γ-rays. For the high OH PSS core fibers, doses on the order of at least 100,000 Gray are sufficient to reduce the (i.e. initially high) induced losses to about 30 dB/km in the visible wavelength region (i.e. 400–700 nm).

Figure 1A:
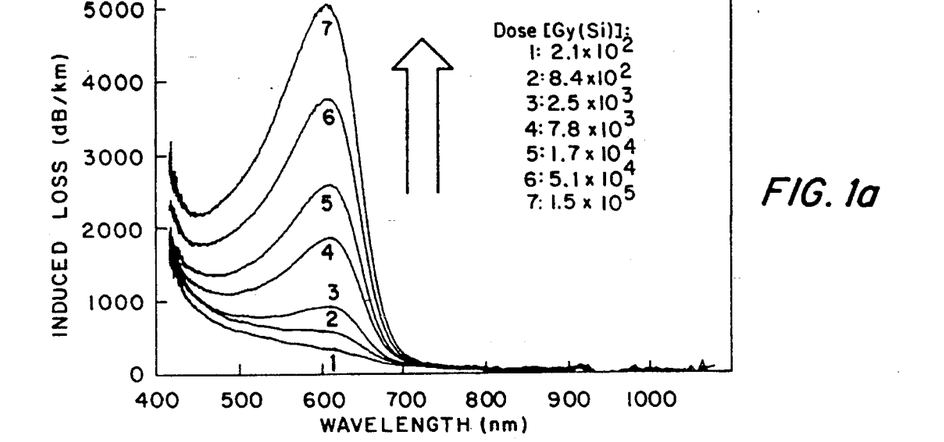
FIGS. 1a and 1b are plots of optical losses induced in situ by γ-rays in a high-OH (e.g. 100 μm diameter silica core, 600–800 ppm OH, and 140 μm diameter F-doped-silica cladding) pure-silica-core/F-doped-silica clad fiber as a function of wavelength wherein the plots are taken during exposure to increasing doses of irradiation during which white light of about 5 μW is continuously propagating in the fiber. The total irradiation doses corresponding to the various numbered traces of FIGS. 1a and 1b being.
Figure 1B:
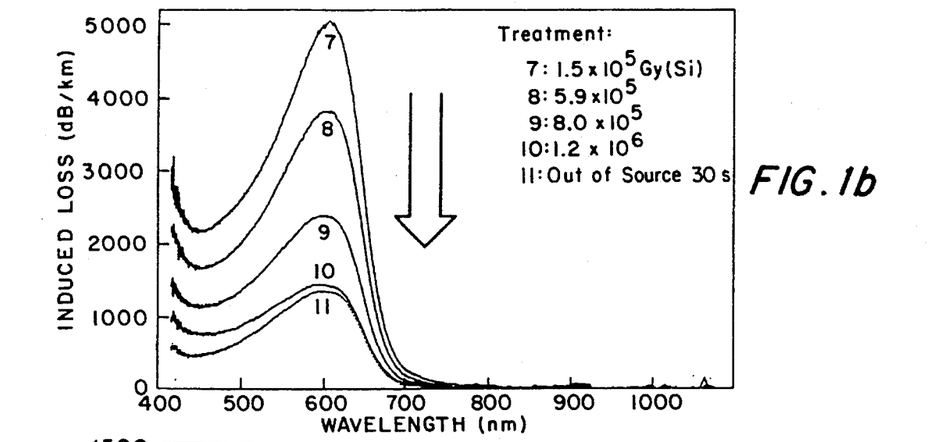
Figure 2A:
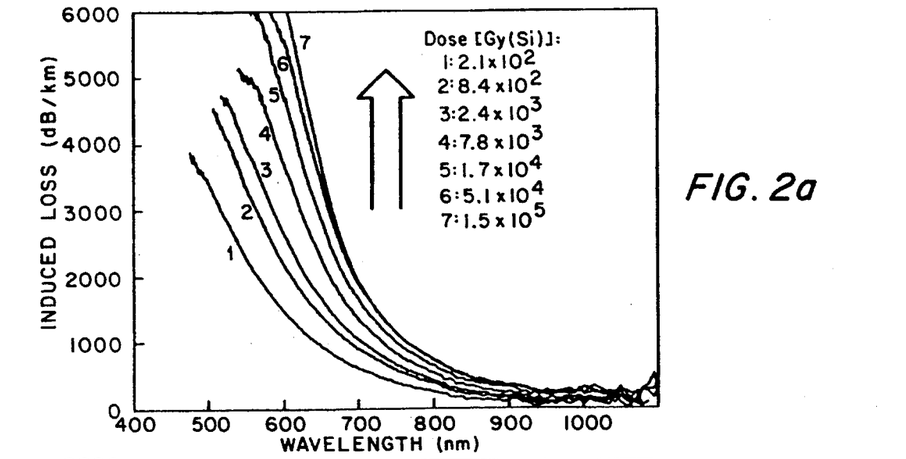
FIGS. 2a and 2b are plots of optical losses induced in situ by γ-rays in a low-OH (e.g. 100 μm diameter silica core, less than 1 ppm OH, and 140 μm diameter F-doped-silica cladding) pure-silica-core/F-doped-silica clad fiber as a function of wavelength wherein the plots are taken during exposure to increasing doses of irradiation during which white light of about 5 μW is continuously propagating in the fiber. The irradiation doses corresponding to the various numbered traces of FIGS. 2a and 2b being.
Figure 2B:
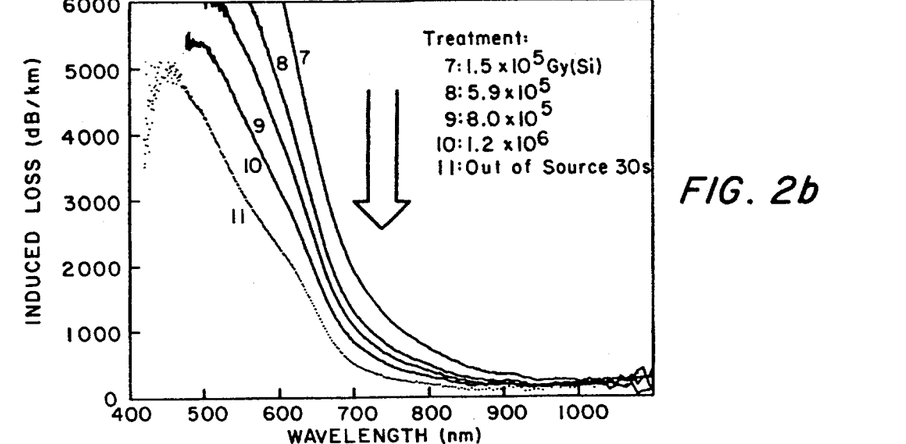

One difference between the low OH PSS core fibers and the high OH PSS core fibers is that the radiation induced absorption spectra from the low OH PSS fibers exhibit an ultraviolet tail (UV tail) which is nearly absent in the spectra of the high OH PSS fibers. It is believed that the UV tail is due to the presence of higher amounts of chloride impurities present in the low OH PSS core fibers which impurities are absent or minimally present in the high OH PSS core fibers. For example, the spectra as depicted in FIGS. 1a and 1b represent the spectra from exemplary high OH PSS core fibers while the spectra as depicted in FIGS. 2a and 2b represent the spectra from exemplary low OH PSS core fibers. The clear difference between these spectra from FIGS. 1a and 1b versus the spectra from FIGS. 2a and 2b is that large induced losses are observed in the spectra corresponding to the low OH PSS core fibers (i.e. FIGS. 2a and 2b) between about 400 to about 600 nm wavelengths which are nearly absent in the spectra corresponding to the high OH PSS core fibers (i.e. FIGS. 1a and 1b). The large induced losses observed in FIGS. 2a and 2b in the 400 to 600 nm region are due to the presence of remnant chloride impurities in the low OH PSS core fibers and which chloride is nearly absent or minimally present in the high OH PSS core fibers.

In order to attenuate the (i.e. initially high) induced losses in the low OH PSS core fibers, the total dose of radiation to obtain induced losses of about 30 dB/km in the 400 to 700 nm range is at least about 10,000,000 Gray (or 1,000,000,000 rad). However, it should be noted that a dose of γ-rays sufficient to result in radiation hardening to about 30 dB/km in the visible wavelength region is that dose of γ-rays sufficient to overcome the effects of NBOHC precursors and remnant chloride impurities that may be present in the PSS core fibers and contributing to the initialy high induced losses exhibited by such PSS core fibers in the visible wavelength region (i.e. about 400 to about 700 nm).

In order to produce radiation hardening, irradiation (i.e. ionizing radiation) can be provided by various radiation (i.e. ionizing radiation) sources. For example, such sources include $^{60}$Co, $^{133}$Cs, X-rays (e.g. of about 30 eV to about 1,000,000 eV) and/or electron beams (e.g. of about 30 eV to about 1,000,000 eV). Energetic charged particles (e.g. MeV protons) also cause ionization, though additional effects due to direct collisions of the particle with an atomic nucleus can occur. As previously stated, the amount of the ionizing radiation dose needed to produce radiation hardening to about 30 dB/km in the visible wavelength region is believed to be related to the amount of NBOHC precursors and chloride impurities present in the PSS core fibers. For example, if the concentration of NBOHC precursors present in a low OH PSS core fiber is low, then it is possible that a dose below the typical dose of 10,000,000 Gray is sufficient to produce radiation hardening to about 30 dB/km in the visible wavelength region. Similarly, for example, if the concentration of chloride impurities in a low OH PSS core fiber is low, then it is possible that a dose below the typical dose of 10,000,000 Gray is sufficient to produce radiation hardening to about 30 dB/km in the visible wavelength region.

The amount of chloride present in a low OH PSS core fiber and/or a high OH PSS core fiber is typically between about 0 to about 5000 parts per million (ppm) chloride. More typically, the amount of chloride present in a low OH PSS core fiber and/or high OH PSS core fiber is between about 0 to about 3000 ppm chloride. Even more typically, the amount of chloride present in a low OH PSS core fiber and/or high OH PSS core fiber is between about 0 to about 1000 ppm chloride. Most typically, the amount of chloride present in a low OH PSS core fiber and/or high OH PSS core fiber is between about 0 to about 500 ppm chloride. In addition, the content of chloride may vary from about 0 to about 250 ppm or from about 0 to about 100 ppm chloride. Generally, however, the chloride content in a low OH PSS core fiber is higher than the chloride content in a high OH PSS core fiber.

The effect of chloride impurities, in addition to NBOHC centers, in a PSS fiber is that a higher radiation dose may be needed to produce an equal amount of radiation hardening as compared to a PSS fiber that contains little or no chloride content.

As previously described, radiation hardening of PSS core fibers can be accomplished by exposing the PSS fiber to a sufficient dose of radiation alone. Alternatively, the PSS core fiber radiation hardening can be accomplished by exposing the PSS fiber simultaneously to a sufficient dose of ionizing radiation and white light. Typically, the power of white light is between about 1 picowatt to about 10 W or more. More typically, the power of white light is between about 0.001 µW to about 1 W or more. Most typically, power of white light is between about 0.01 µW to about 0.1 W or more. Preferably, power of white light is between about 0.1 µW to about 10 mW or more. More preferably, power of white light is between about 1.0 µW to about 1 mW or more. Most preferably, power of white light is between about 5 µW to about 100 µW or more. As with the ionizing radiation dose, it is to be understood that the power of white light used in conjunction with the radiation dose delivered to the PSS fiber core is that power sufficient to attenuate the induced losses caused by NBOHC centers and/or chloride impurities present within PSS core fibers down to a level of about 30 dB/km in the visible wavelength region. Thus, light intensity greater than zero but less than about 1 picowatt may be sufficient to result in the radiation hardening to no more than about 30 dB/km in the visible wavelength region at a radiation level of about 100,000 Gray or more. The white light power (used in conjunction with radiation dose delivered) is typically proportional to the concentration of NBOHC centers and chloride impurities present within the PSS core fiber. Thus, the fewer the NBOHC centers and/or chloride impurities, the lower the white light power that will be needed to produce radiation hardening down to a level of about 30 dB/km at a given wavelength within the visible wavelength region from about 400 nm to about 700 nm.

The radiation hardening that is achieved by the presently claimed invention can be selected from the following varying levels of radiation hardness:

(1) zero to about 1000 dB/km, (2) about 10 to about 300 dB/km, and (3) about 30 to about 100 dB/km.

The visible wavelength region from about 400 to about 700 nm can further be subdivided into sub-regions of:

(1) from about 400 nm to about 450 nm (2) from about 450 nm to about 500 nm (3) from about 500 nm to about 550 nm (4) from about 550 nm to about 650 nm, and (5) from about 650 nm to about 700 nm.

For a given application, one can choose a particular sub-region of the visible wavelength in which to achieve radiation hardening to about 30 dB/km or less. The dose of radiation alone or the dose of radiation with white light exposure necessary to achieve a given level of radiation hardening (e.g. about 30 dB/km or less) is dependent upon the sub-region of the visible wavelength within which radiation hardening is desired.

Having described the invention, the following examples are given to illustrate specific applications of the invention, including the best mode now known to perform the invention. These specific examples are not intended to limit the scope of the invention described in this application.

EXAMPLES

Samples comprised two high-OH and one low-OH pure-silica-core/F-doped-silica-clad fibers drawn by CeramOptec from Heraeus Fluosil™ preforms. The two high-OH pure-silica-core fibers are designated UV100/120 and UV100/140 (the numbers expressing the core and clad diameters in µm); the core materials of both were Suprasil™-F100 containing 600–800 ppm OH by weight. The low-OH pure-silica-core fiber is designated WF100/140 and its core consisted of Suprasil™M-F300 with OH content <1 ppm. All of these fibers had acrylate jackets. However, other polymeric jackets may be used. Metal jackets may also be used. Exemplary polymeric jackets include poyimide and silicone. Exemplary metal jackets include Cu, Zn, Sn, Ag, Al, Au and mixtures thereof.

Two seventeen-meter lengths of each fiber type were used in the experiment; these will be referred to as the sample and reference fibers. The central three meters of the sample fiber were coiled around a 5-cm-diameter paper cylinder. This 3-m sample coil was placed in a water-tight stainless steel can for insertion in the central hole of the NRL "swimming pool" $^{60}$Co γ-ray source (i.e. a water shielded gamma ray source) producing an isotropic dose rate in this position of 7.0 Gy/s. The two 7-m 'pigtails' were conducted from the insertion can through a plastic hose to the surface of the pool. The reference fiber was similarly deployed except that the maximum length exposed to the full γ-ray flux was ~10 cm, while 3 meters of length were added to the top of the input pigtail in the form of a 5-cm-diameter cylinder (to emulate the sample fiber as closely as possible).

Spectroscopy was carried out in the following way. Light from a quartz-tungsten-halogen lamp was injected into a pair of 100/140 silica-core fiber segments, each fashioned into a mode scrambler/cladding-mode stripper and spliced to the input port of one of two Corning SDF100/140 1×4 fiber optic couplers The injection-end pigtails of each reference-fiber/sample-fiber pair were fusion spliced to output ports of one of these two couplers, thus assuring that the same light spectrum passed through both members of the pair. The eight pigtails returning from the irradiation vessel were cleaved and carefully aligned in a vertical stack at the input end of a prism-based CCD-camera spectrometer described elsewhere. See D. L. Griscom, M. E. Gingerich, E. J. Friebele, M. A. Putnam and W. Unruh, Applied Optics 33, 1022–1028 (1994), incorporated herein by reference in its entirety and for all purposes. The induced loss (dB/km) in each 3-m sample coil was determined as a function of wavelength λ according to $$L_{Induced}(\lambda) = 3333 \, Log_{10}[C \, I_0(\lambda)/I(\lambda)],$$

where $I_0(\lambda)$ was the light intensity exiting the reference fiber and $I(\lambda)$ was the intensity exiting the sample fiber. These intensities were initially recorded versus horizontal pixel position on the CCD camera and were converted to a function of wavelength by means of a calibration developed by inserting a series of interference filters ahead of the camera. In Eq. (1), C is an empirical constant (~1.00) compensating for differential losses in the fiber splices; this number was determined independently for each sample/reference fiber pair by constraining the pre-irradiation loss $L_{init}(700 \, nm)$ to equal zero. Ideally, this "zero-cutback" method should yield $L_{init}(\lambda)$ 0 for all, but in practice a sloping baseline was observed with $L_{init}(415 \, nm) \approx 50$ dB/km. In operation, a Corning 4–70 filter and a 2.00.D. neutral density filter were placed in front of the camera, the former to flatten the spectral response of the camera and the latter to permit integration times as long as 0.05 s when the intensity of the injected light was ~5 µW. Light of this intensity was propagated continuously during the first and second irradiations and during an intervening period out of the source. Synthesis of pure-synthetic-core fibers is well-known to those of ordinary skill in the art. Fibers used in these examples are industry standard fibers which are subjected to the presently claimed process to form the claimed radiation hardened fibers.

EXAMPLE 1

Spectral data for exemplars of the high- and low-OH pure-silica-core fibers (UV100/140 and WF100/140) are displayed in FIGS. 1a, 1b, 1c, and 2a, 2b, 2c, respectively. The upward- and downward-pointing arrows in parts (a) (i.e. FIGS. 1a, 2a) and (b) (i.e. FIGS. 1b, 2b), respectively, of both figures emphasize an unexpected result: The monotonic growth behaviors of the induced losses for doses up to 150 kGy are followed by sharp decreases in these losses at higher doses. Synthesis of pure-synthetic-core fibers is well-known to those of ordinary skill in the art. Fibers used in these examples are industry standard fibers which are subjected to the presently claimed process.

Figure 1C:
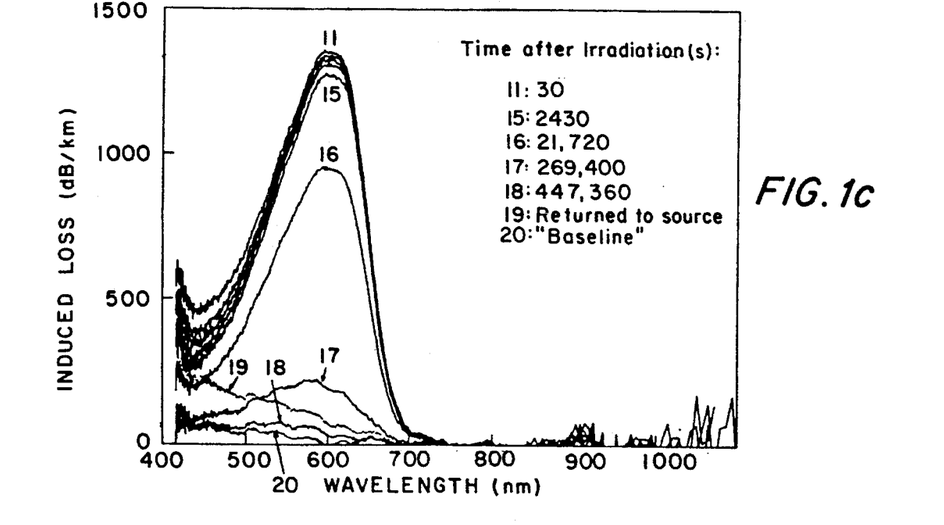
FIG. 1c is a plot of induced loss versus wavelength taken at various times, during which white light of about 5 μW is continuously propagating in the fiber, after the exposure to an irradiation dose of $1.2 \times 10^6$ Gray (Gy). The amount of time out of γ-ray irradiation source being.
Figure 2C:
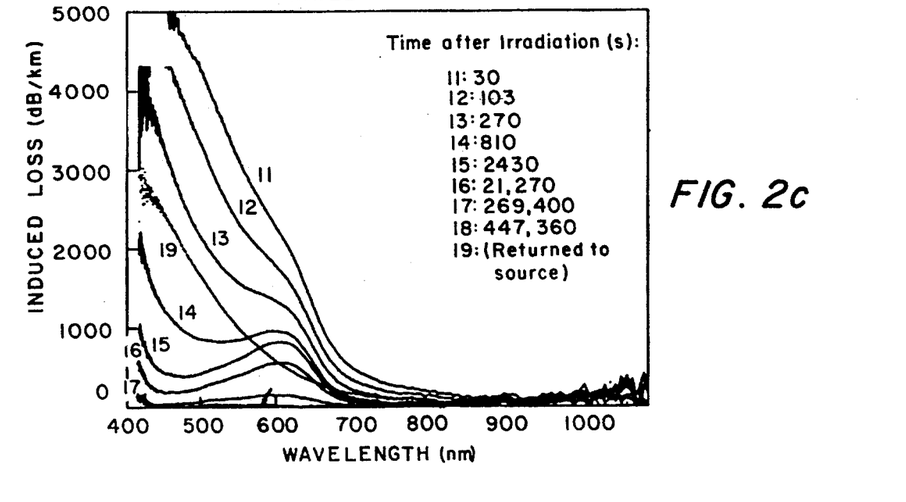
FIG. 2c is a plot of induced loss versus wavelength taken at various times, during which white light of about 5 μW is continuously propagating in the fiber, after the exposure to an irradiation dose of $1.2 \times 10^6$ Gray (Gy). The amount of time out of γ-ray source being.

After the samples had accumulated a dose of 1.2 MGy, the sample vessel was withdrawn from the source and bleaching due to a combination of thermal (T~22° C.) and optical processes was observed: panels (c) (i.e. FIGS. 1c, 2c). Also shown in these panels is the fact that subsequent returning of the samples to the source resulted in an 'instant' restoration of the UV band tail, which was weakly present in UV100/140 but dominant in WF100/140. Induced losses in fiber UV100/120 (not shown) behaved similarly to those in UV100/140 except that the dose-for-dose strengths of the induced 610-nm band and UV tail were lower by factors of ~2–2.5 and peaked at slightly lower doses in UV 100/120.

EXAMPLE 2

To better visualize the kinetic processes at work here, the induced losses at a fixed wavelength are plotted versus dose or time in FIGS. 3a, 3b, 3c, 3d and 3e for one member of each of the two generic fiber types. The selected wavelength for both pure-silica-core fiber types was 610 nm, corresponding to the peak of the NBOHC band (but also including measurable contributions from the UV band tail).

Figure 3A:
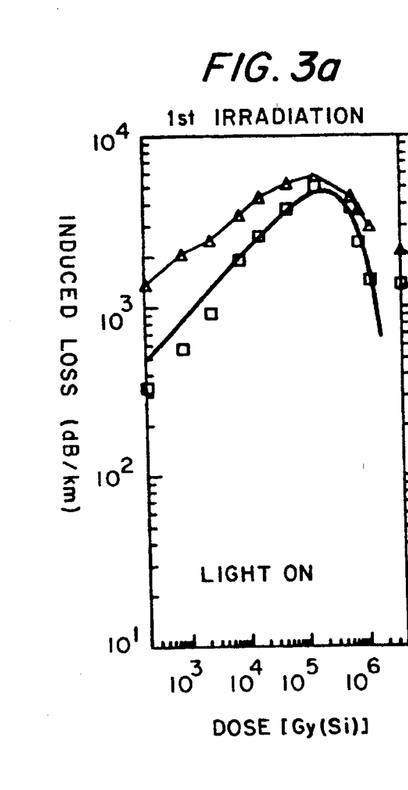
FIGS. 3a, 3b, 3c, 3d and 3e are plots of γ-ray induced optical losses at fixed wavelength versus dose or time out of source for the two exemplary fibers described above: (□) high-OH pure silica core; and (Δ) low-OH pure-silica core. White light—5 μW was continuously propagating in all fibers during collection of data for plots 3a, 3b and 3c. The light was off (except 2 seconds per data point) during collection of data points for plots 3d and 3e.
Figure 3B:
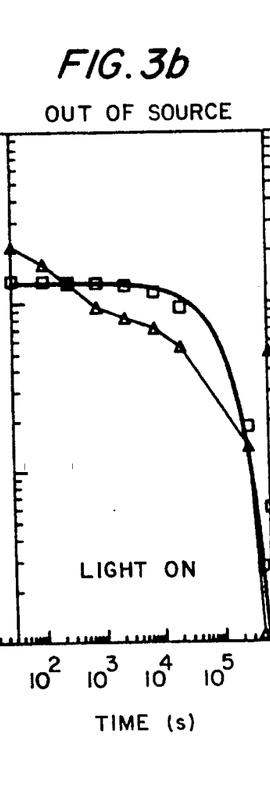
Figure 3C:
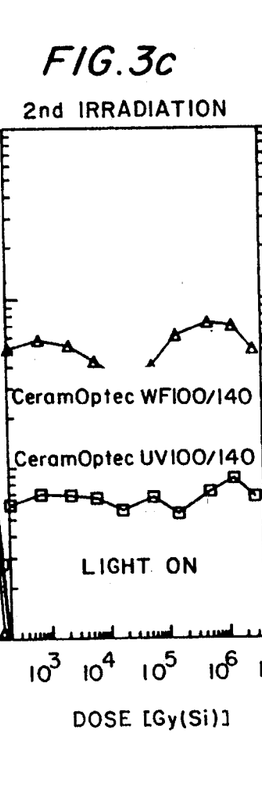
Figure 3D:
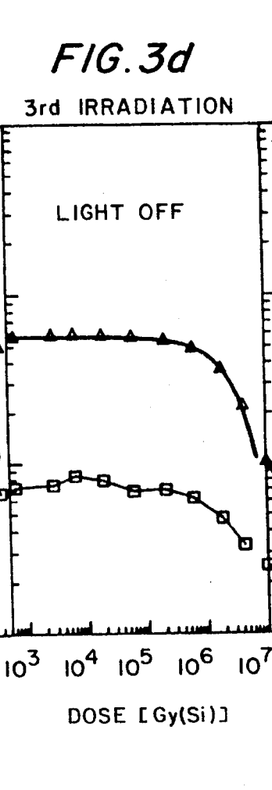
Figure 3E:
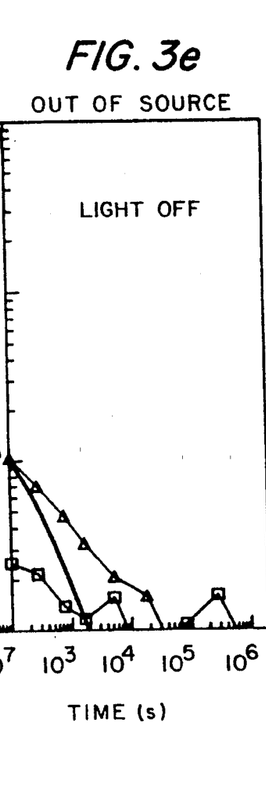

The thin curves in FIGS. 3a, 3b, 3c, 3d, and 3e are straight lines connecting data points. The bold curves in FIGS. 3(b) and (d) are exponential decay curves (1/e time constants: $\pi$=32 h and 167 h, respectively) fitted to the data by cut and try. The bold curve in part (a) (i.e. FIG. 3a) is an empirical power-law growth curve (exponent=0.38) multiplied by an exponential decay function ($\pi$=22 h). The bold curve in panel (e) (i.e. FIG. 3e) is a second-order kinetic solution ($\pi_{1/2}$=100 s) employing the last triangular data point in panel (d) (i.e. FIG. 3d) as the zero-time point. The decays evident in FIG. 3(e) are purely thermal annealing effects, since the sample was subjected to neither $\gamma$ rays nor propagating light (save for ~2 s per data point) during the period of measurement.

Analogously, it can be argued that the exponential decreases ($\pi$=167 h) apparent in FIG. 3(d) are purely a radiation bleaching effect, since the induced absorptions had reached steady state equilibrium with the radiation flux at the lowest doses in panel (c) (i.e. FIG. 3c) and the final decays in panel (d) (i.e. FIG. 3d) took place in the absence of light.

EXAMPLE 3

Figure 4:
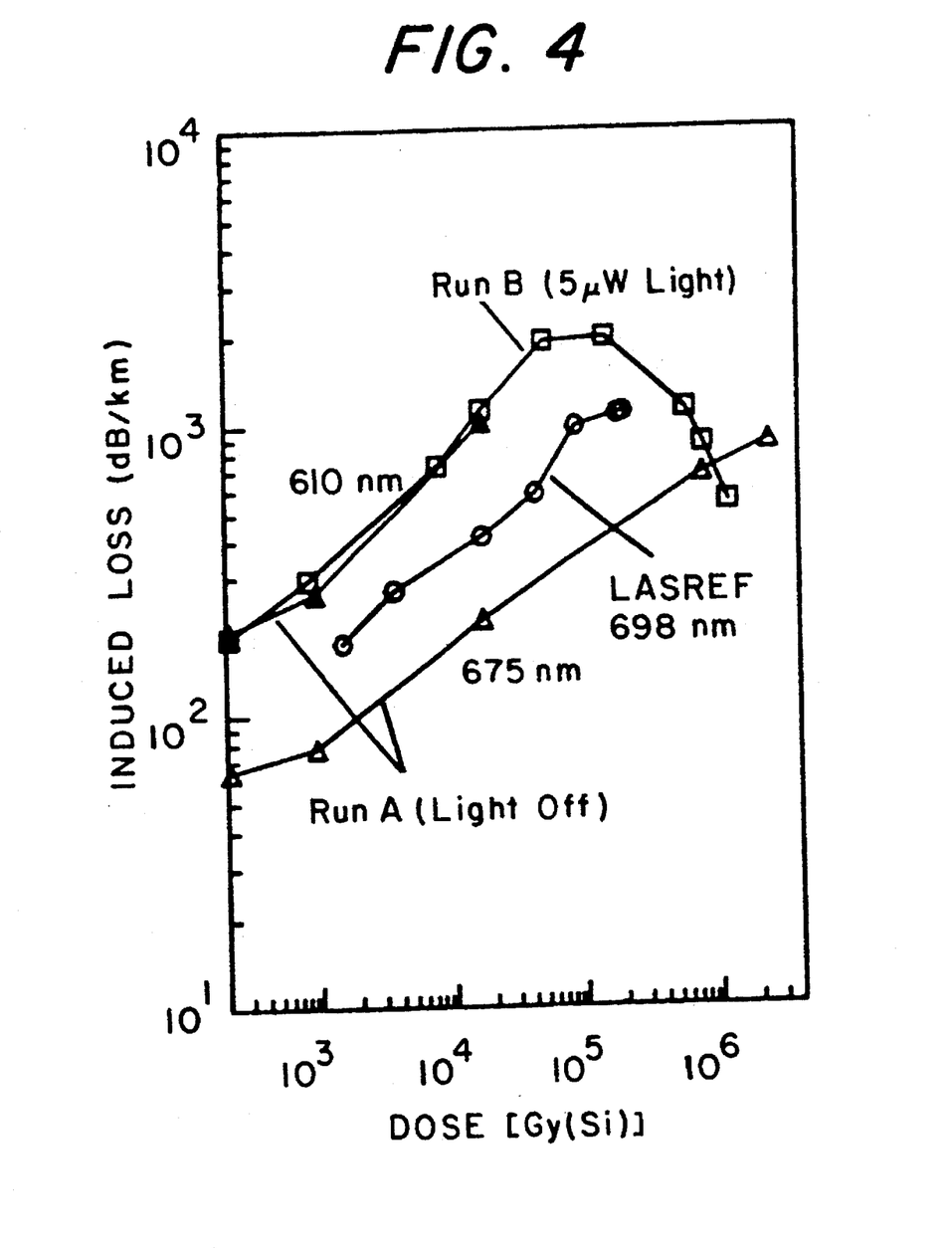
FIG. 4 is a plot of induced losses at selected wavelengths induced by γ rays (Runs A and B) and by fast neutrons (LASREF) in lengths of another pure-silica-core high OH fiber (e.g. 100 μm diameter silica core, 600–800 ppm OH, and 120 μm diameter F-doped-silica cladding) all taken from the same spool. No light was propagated during Run A; white light at levels of ~5 μW and ~0.1 μW was continuously propagated during Run B and the LASREF experiment, respectively. The equivalent neutron dose (LASREF) assumed here is based on estimated fluences converted to ionizing dose according to 1 gray=$3\times10^{11}$ n/cm$^2$.

To interpret the decay kinetics of FIGS. 3(a) and (b), it is necessary to draw upon some results of an earlier experiment (designated Run A—see FIG. 4) carried out somewhat differently than described for the previous examples wherein data for FIGS. 1a, 1b, 1c, 2a, 2b, 2c, 3a, 3b, 3c, 3d and 3e were obtained. The main factors distinguishing Run A were (i) the use of 20-m sample lengths and (ii) the execution of the entire experiment without light propagating in the fibers except for a few seconds during each CCD-camera frame grab. Due to factor (i) the dynamic range of the spectrometer was exceeded for Run-A measurements at wavelengths $\leq$650 nm at doses $\geq$100 kGy. However, as illustrated in FIG. 4, the Run-A losses at longer wavelengths for a sample of fiber UV100/120 grew monotonically with dose all of the way to the termination of the experiment at a dose of 2.8 MGy—in sharp contrast with the results of the experiment of Run B where all pure-silica-core fibers exhibit 610-nm bands which first grow with increasing dose up to ~100 kGy before finally decreasing exponentially at higher doses. Because spectral data for fiber UV100/120 exhibited identical 610-nm bands in Runs A and B up to a dose of ~20 kGy (where the band peak became clipped in Run A), it is reasonably assumed that the high-dose kinetic behavior of this NBOHC band in Run A can be safely inferred from the longer-wavelength data, as exemplified in FIG. 4. Since the kinetics for Run A (irradiation in dark) imply monotonic growth of the NBOHC band up to and beyond 1 MGy, the exponential declines at doses >100 kGy seen in FIGS. 3(a) and 4 likely bear a causal relationship to the light propagating at a level of ~5 $\mu$W in the Run B but not in Run A.

Even though the post-irradiation decay kinetics were not monitored in Run A, inductive arguments can be mounted that the exponential recoveries seen in FIG. 3(b) must also be related to the propagation of white light: First, if there were a thermal process giving rise to such an exponential decay, it would inevitably cause a downturn in any linear (or sublinear) growth curve as soon as the irradiation time becomes greater than the decay constant. But this effect was not observed in Run A. Second, the time constant of the exponential of FIG. 3(b) is only 50% greater than that of FIG. 3(a). Thus, assuming that the long-time-constant out-of-source exponential bleaching is an optical effect allows the similar, but slightly more rapid, bleaching of FIG. 3(a) to be interpreted as a synergistic effect of the simultaneous $\gamma$ and optical photon fluxes.

In any event, comparison of panels (b) (i.e. FIG. 3b) and (e) (i.e. FIG. 3e) clearly show that the decays in the pure-silica-core fibers taking place with time constants ~100 s are thermally activated, since they occur independently of the propagation of light. Note in FIGS. 1(c) and 2(c) that the short-time out-of-source bleaching behaviors of the pure-silica-core fibers are confined solely to declines in the UV tail, whereas the exponential ($\pi$=32 h) behaviors attach only to the 610-nm NBOHC band. Note too that the bleaching of the NBOHC band is permanent, whereas the UV tail recovers to a new steady-state equilibrium as soon as the samples are returned to the source, as illustrated spectrally by curves 19 in FIGS. 1c and 2c and kinetically by the data of panels (c) (i.e. FIG. 3c) and (d) (i.e. FIG. 3d).

What is claimed is:

1. A process for radiation hardening a pure-silica-core fiber, the process comprising the steps of:
   (a) providing a pure-silica-core fiber having a core index of refraction and having an outer surface;
   (b) exposing said fiber to a dose of ionizing radiation sufficient to permanently reduce transmission losses of said fiber to no more than about 30 dB/km within a wavelength range of about 400 nm to about 700 nm.

2. The process of claim 1 wherein said dose is at least 100,000 Gray.

3. The process of claim 2 wherein said wavelength range is between about 400 to about 450 nm.

4. The process of claim 2 wherein said wavelength range is between about 450 to about 500 nm.

5. The process of claim 2 wherein said wavelength range is between about 500 to about 550 nm.

6. The process of claim 2 wherein said wavelength range is between about 550 to about 650 nm.

7. The process of claim 2 wherein said wavelength range is between about 650 to about 700 nm.

8. The process of claim 2 wherein said core of said fiber is doped with F.

9. The process of claim 2 wherein said fiber is surrounded by and in contact with a doped-silica-cladding, containing a dopant, along said outer surface of said fiber, said doped-silica-cladding having a cladding index of refraction, said cladding index of refraction being less than said core index of refraction, and said doped-silica-cladding having a cladding outer surface.

10. The process of claim 9 wherein said dopant is F.

11. The process of claim 10 wherein said cladding is surrounded by and in contact with a jacketing material along said cladding outer surface.

12. The process of claim 11 wherein said jacketing material is selected from the group consisting of acrylate, polyimide, silicone, a metal and mixtures thereof.

13. The process of claim 12, wherein said jacketing material is a metal selected from the group consisting of Al, Cu, Zn, Sn, Ag, Au, and mixtures thereof.

14. A radiation hardened pure-silica-core fiber made according to the process of claim 12.

15. The process of claim 1, further comprising the step of adding hydrogen to said pure-silica-core fiber.

16. The process of claim 15, further comprising the step of hermetically sealing said pure-silica-core fiber after said step of adding hydrogen to said pure-silica-core fiber.

17. A radiation hardened pure-silica-core fiber, said fiber comprising pure-silica exhibiting radiation induced losses of no more than 30 dB/km within a wavelength range of about 400 nm to about 700 nm at a radiation dose of at least about 100,000 Gray.

18. The fiber of claim 17 wherein said fiber has an OH content from about 400 to about 2000 ppm.

19. The fiber of claim 17 wherein said fiber has an OH content from about 500 to about 1400 ppm.

20. The fiber of claim 17 wherein said fiber has an OH content from about 575 to about 900 ppm.

21. The fiber of claim 17, wherein said fiber has an OH content from about 400 to about 2000 ppm, and a chloride content from about 0 to about 5000 ppm.

22. The fiber of claim 17 wherein said dose is at least about 10,000,000 Gray.

23. The fiber of claim 22 wherein said fiber has an OH content from about 1 part per billion to about 399 ppm.

24. The fiber of claim 23 wherein stud fiber has an OH content from about 1 to about 250 ppm.

25. The fiber of claim 23 wherein said fiber has an OH content from about 0.2 to about 100 ppm.

26. The fiber of claim 23 wherein said fiber has an OH content from about 0.01 to about 10 ppm.

27. The fiber of claim 17, wherein said fiber has a chloride content from about 0 to about 5000 ppm.

28. The fiber of claim 17, wherein said fiber has an OH content from about 0.01 to about 10 ppm, and a chloride content from about 0 to about 5000 ppm.

29. A process for radiation hardening of pure-silica-core fibers, the process comprising the steps of:

(a) providing a pure-silica-core fiber having a core index of refraction and having an outer surface;

(b) propagating white light through said fiber; and (c) simultaneously exposing said fiber to a dose of ionizing radiation sufficient to permanently reduce transmission losses of said fiber to no more than about 30 dB/km within a wavelength range of between about 400 nm to about 700 nm.

30. The process of claim 29 wherein said dose is at least 100,000 Gray and said light has an intensity range within about 1 picowatt to about 10 W.

31. The process of claim 30 wherein said intensity range is between about 0.01 µW to about 0.1 W.

32. The process of claim 30 wherein said intensity range is between about 1.0 µW to about 1 mW.

33. The process of claim 30 wherein said intensity range is between about 5.0 µW to about 100 mW.

34. The process of claim 30 wherein said wavelength range is between about 400 to about 450 nm.

35. The process of claim 30 wherein said wavelength range is between about 450 to about 500 nm.

36. The process of claim 30 wherein said wavelength range is between about 500 to about 550 nm.

37. The process of claim 30 wherein said wavelength range is between about 550 to about 650 nm.

38. The process of claim 30 wherein said wavelength range is between about 650 to about 700 nm.

39. The process of claim 30 wherein said fiber is doped with F.

40. The process of claim 30 wherein fiber is surrounded by and in contact with a doped-silica-cladding, containing a dopant, along said outer surface of said fiber, said doped-silica-cladding having a cladding index of refraction, said cladding index of refraction being less than said core index of refraction, and said doped-silica-cladding having a cladding outer surface.

41. The process of claim 40 wherein said dopant is F.

42. The process of claim 40 wherein said cladding is surrounded by and in contact with a jacketing material along said cladding outer surface.

43. The process of claim 42 wherein said jacketing material is selected from the group consisting of an acrylate, a polyimide, a metal and mixtures thereof.

44. The process of claim 43 wherein said jacketing material is a metal selected from the group consisting of Al, Cu, Zn, Sn, Ag, Au, and mixtures thereof.

45. A radiation hardened pure-silica-core fiber made according to the process of claim 42.

* * * * *